Figure 1:
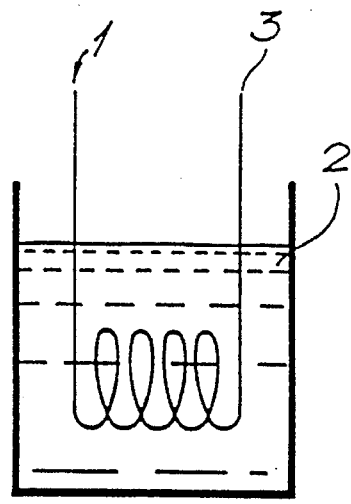

United States Patent [19]
Livingston

[11] Patent Number: 5,585,004
[45] Date of Patent: Dec. 17, 1996

[54] TREATMENT OF AQUEOUS MEDIA CONTAINING ORGANIC MATERIAL USING TUBULAR MEMBRANES

[75] Inventor: Andrew Livingston, London, Great Britain

[73] Assignee: Imperial College of Science Technology & Medicine, London, Great Britain

[21] Appl. No.: 211,159

[22] PCT Filed: Sep. 18, 1992

[86] PCT No.: PCT/GB92/01719

§ 371 Date: Jun. 10, 1994

§ 102(e) Date: Jun. 10, 1994

[87] PCT Pub. No.: WO93/06045

PCT Pub. Date: Apr. 1, 1993

[30] Foreign Application Priority Data

Sep. 18, 1991 [GB] United Kingdom .................. 9119955

[51] Int. Cl.⁶ .......................... B01D 61/00; B01D 63/02
[52] U.S. Cl. ............... 210/651; 210/321.27; 210/500.21; 210/500.23; 210/909
[58] Field of Search ................ 210/321.87, 500.21, 210/615, 651, 909, 500.23

[56] References Cited

U.S. PATENT DOCUMENTS

| | | | |
|---|---|---|---|
| 3,420,898 | 1/1969 | Van Winkle et al. | 260/632 |
| 3,440,291 | 4/1969 | Van Winkle et al. | 260/632 |
| 3,496,203 | 2/1970 | Morris et al. | 260/439 |
| 3,496,204 | 2/1970 | Morris et al. | 260/439 |
| 3,501,515 | 3/1970 | Van Winkle et al. | 260/439 |
| 3,580,840 | 5/1971 | Uridil | 210/634 |
| 3,617,553 | 11/1971 | Westaway et al. | 210/23 |
| 3,893,926 | 7/1975 | Awad | 210/321.64 |
| 4,252,652 | 2/1981 | Elfert et al. | 210/654 |
| 4,266,026 | 5/1981 | Breslau | 210/632 |
| 4,363,765 | 12/1982 | Fiato et al. | 260/429 R |
| 4,440,853 | 4/1984 | Michaels et al. | 210/615 |
| 4,647,539 | 3/1987 | Bach | 210/321.67 |
| 4,715,217 | 12/1987 | Coyne et al. | 210/656 |
| 4,717,775 | 1/1988 | Billig et al. | 568/454 |

(List continued on next page.)

FOREIGN PATENT DOCUMENTS

| | | |
|---|---|---|
| 263953 | 4/1988 | European Pat. Off. . |
| 3245318 | 6/1984 | Germany . |
| 8700881 | 11/1988 | Netherlands . |
| 988941 | 4/1965 | United Kingdom . |
| 1109787 | 4/1968 | United Kingdom . |
| 1243507 | 8/1971 | United Kingdom . |
| 1243508 | 8/1971 | United Kingdom . |
| 1260733 | 1/1972 | United Kingdom . |
| 1266180 | 3/1972 | United Kingdom . |
| 1312076 | 4/1973 | United Kingdom . |
| 1432561 | 4/1976 | United Kingdom . |
| WO9419104 | 9/1994 | WIPO . |

OTHER PUBLICATIONS

Abstract of Japanese Publication No. JP1222768 Dated Jun. 12, 1989, Abstract vol. 013546.

*Primary Examiner*—Robert A. Dawson
*Assistant Examiner*—Kenneth M. Jones
*Attorney, Agent, or Firm*—Fay, Sharpe, Beall, Fagan, Minnich & McKee

[57] ABSTRACT

A method of reducing the concentration of at least one organic compound present in an aqueous feedstock, wherein said feedstock is supplied to one side of a substantially water-insoluble selectively permeable polymeric sheet or tubular membrane whose permeability to the or each said organic compound exceeds its permeability to chloride ion whilst simultaneously maintaining in contact with the other side of said membrane an aqueous reaction medium containing biologically active reaction means capable of reacting with said at least one compound after it permeates through the wall of the tubular membrane. Apparatus, preferably enclosed, for carrying into effect the method is also disclosed and permits treatment of waste waters containing volatile organic compounds. Modular bioreactor apparatus in the form of a cartridge containing a bundle of polymeric membrane tubes is also disclosed.

36 Claims, 6 Drawing Sheets

U.S. PATENT DOCUMENTS

| Number | Date | Name | Class |
|---|---|---|---|
| 4,746,435 | 5/1988 | Onishi et al. | 210/615 |
| 4,769,498 | 9/1988 | Billig et al. | 568/454 |
| 4,774,361 | 9/1988 | Maher et al. | 568/454 |
| 4,851,216 | 7/1989 | Lee | 210/500.27 |
| 4,885,401 | 12/1989 | Billig et al. | 568/454 |
| 4,891,137 | 1/1990 | Nohl et al. | 210/644 |
| 4,966,699 | 10/1990 | Sasaki et al. | 210/500.23 |
| 4,988,443 | 1/1991 | Michaels et al. | 210/615 |
| 4,990,350 | 2/1991 | Rohmann | 210/652 |
| 5,064,764 | 11/1991 | Besnainon et al. | 210/321.8 |
| 5,113,022 | 5/1992 | Abatjoglu et al. | 568/454 |
| 5,116,506 | 5/1992 | Williamson et al. | 210/615 |
| 5,143,620 | 9/1992 | Chou et al. | 210/640 |
| 5,149,649 | 9/1992 | Miyamori et al. | 210/500.21 |
| 5,174,899 | 12/1992 | Bahrmann et al. | 210/644 |
| 5,205,934 | 4/1993 | Linder et al. | 210/500.43 |
| 5,215,667 | 6/1993 | Livingston et al. | 210/651 |
| 5,264,616 | 11/1993 | Roeper et al. | 560/175 |
| 5,265,734 | 11/1993 | Linder et al. | 210/654 |
| 5,288,818 | 2/1994 | Livingston et al. | 210/640 |
| 5,288,918 | 2/1994 | Maher et al. | 568/454 |
| 5,298,699 | 3/1994 | Healy et al. | 568/492 |
| 5,312,996 | 5/1994 | Packett | 568/454 |
| 5,360,938 | 11/1994 | Babin et al. | 568/449 |
| 5,364,950 | 11/1994 | Babin et al. | 556/2 |
| 5,395,479 | 3/1995 | Dickman et al. | 568/454 |

1

TREATMENT OF AQUEOUS MEDIA CONTAINING ORGANIC MATERIAL USING TUBULAR MEMBRANES

This invention is concerned with methods of and apparatus for treating aqueous media which contain organic compounds which is to be biologically decomposed into less environmentally polluting by-products.

The present invention has principal application in the field of treating industrial waste waters contaminated with organic pollutants, to achieve substantial or even complete decomposition into less harmful decomposition by-products prior to discharge or to further purification.

Certain industrial waste waters are contaminated with organic materials, particularly aromatic organic compounds such as, for example, benzene, nitrobenzene, toluene, chloronitrobenzene, aniline, pyridine, phenols, substituted phenols and derivatives of all these compounds.

It is, of course, desirable to further improve upon treatment processes, such as the activated sludge or trickling filter processes, which serve to reduce the content of organic material in industrial waste waters. Environmental directives, which may have subsequent legal effect, stipulate treatment to remove or substantially reduce specified organic compounds before discharge into the environment or before supplementary purification works. There is therefore considerable pressure upon the chemical industry to reduce organic pollutants in discharged waters and the benefits of biological decomposition by micro-organism are becoming increasingly recognised and important.

Furthermore, conventional treatment of waste water containing volatile organic compounds can involve atmospheric discharge of vapours or gases from volatile organic compounds (hereinafter abbreviated in the singular or plural to VOC) which still creates atmospheric pollution, hence it is also desirable to address known problems with biological decomposition of VOC.

VOC are the source of a great deal of concern in the environment, due to primary toxicity (for example, chlorinated hydrocarbons), and also due to secondary effects on atmospheric chemistry. Much technology development in the chemical industry has been aimed at ways of converting these compounds into less harmful by-products. Many routes to oxidation (catalytic incineration, adsorption on activated carbon followed by thermal regeneration of the carbon) have been advanced. The most economical of these, however, remains biological treatment by suitable microorganisms known per se. However, there is a problem associated with aeration of waste waters containing VOC. Aeration is necessary to allow aerobic biological degradation to become established and proceed, but also results in air stripping of VOC from the reactor. Air stripped VOC must then be recovered in an adsorption unit or some such device, before eventual atmospheric discharge of the air.

It is from knowledge of the disadvantages associated with conventional methods of treating waste that has led to the present invention.

In one aspect, the invention provides a method of reducing the concentration of at least one organic compound present in an aqueous feedstock, wherein a flow of said feedstock contacts one surface of a substantially water-insoluble selectively permeable sheet or tubular membrane whose permeability to the or each said organic compound exceeds its permeability to chloride ion, whilst simultaneously maintaining in contact with the other surface of said membrane an aqueous reaction medium containing biologically active reaction means capable of reacting with said at least one compound after it permeates through the wall of the tubular membrane.

The invention also embraces apparatus suitable for carrying the above method into effect, as particularly described subsequently in the illustrated embodiments.

The aqueous supply medium preferably comprises waste water from an industrial process which is contaminated with at least one organic compound and which may or may not contain chloride ion. Several organic compounds may be present and the present method may be employed to reduce the concentration of (i.e. at least partially decompose) more than one organic compound or even all potentially polluting organic compounds present in the waste water which is being treated.

Preferably the compound(s) comprise aromatic compound(s) and these compound(s) may be optionally substituted aromatic compounds, such as, for example, monocyclic aromatic organic compounds. However, aliphatic organic compounds may also be treatable in the present method.

For example the organic compound may comprise one or more of any of the known organic pollutants which it is desirable to remove by decomposition into less harmful by-products: e.g. phenol, substituted phenols, benzene, substituted benzenes e.g. nitrobenzene, substituted nitrobenzenes, chloronitrobenzene, or aniline, substituted anilines, toluene, substituted toluenes, pyridine and substituted pyridines.

The organic compound(s) may comprise VOC (as hereinafter defined) such as low molecular weight chlorinated hydrocarbons capable of permeating through the membrane into the aqueous reaction medium. A 'biofilm' comprising a biologically active film of microorganisms may build up upon the exterior surface of the membrane i.e. the side contacting the reaction medium whereby decomposition of such volatile organic compounds occurs substantially within said biofilm. The active microorganisms, can be fed with air or oxygen and produce carbon dioxide as biological oxidation of the compound(s) take place.

The aqueous feedstock may also contain one or more salts, optionally in relatively high concentration, as non-organic pollutant. Thus for example the supply medium may comprise industrial waste water containing one or more of chloride, sulphate, nitrate or other inorganic salt ion, or acids or bases such as sulphuric, nitric or hydrochloric acids or alkali metal hydroxides.

Additionally or alternatively the aqueous feedstock may be at relatively high or low pH. For example industrial waste water which may be used as feedstock may have a pH of greater than or equal to 8 or a pH of less than or equal to 6. Thus the present invention may be applicable for aqueous feedstock where $pH \geq 9$ or $pH \leq 5$.

The aqueous feedstock may be continuously fed as a stream, so the active microorganisms may thrive as they carry out the biological degradation.

The polymeric membrane is in the form of sheet or tubing, but preferably flexible synthetic rubber such tubing. Whilst its permeability to the chloride ion (as a convenient reference capable of measurement without difficulty) must be less than its permeability to the organic compound(s) desired to be decomposed, it is not essential that chloride ion, or even any other inorganic ion, be present in the aqueous feedstock. However, presence of chloride ion in the feedstock is unlikely to substantially impair effectiveness. The permeability characteristics of the selectively permeable membrane may be modified by pre-treating the membrane with a swelling agent, such as kerosene. The membrane may be comprised of hydrophobic natural or synthetic rubber material preferably with an effective permeability to phenol, and to any one or more of the above noted organic compounds. It is most preferred to use non-porous 'dense phase' material as the membrane, in which pores are not even visible under electron microscope.

There are various materials of which the membrane may be comprised. However it is preferred to use a synthetic silicone rubber material whose wall thickness is in the range of 0.001–10 mm, and/or whose external diameter exceeds 0.5 mm, e.g. 2–3 mm comprising e.g. an alkylsiloxane such as dimethylpolysiloxane silicone rubber. This is a semi-transparent, flexible tubing readily available commercially.

The aqueous reaction medium is preferably water containing biologically active microorganisms, capable of decomposing, such as by oxidation, the said organic compound(s). Nutrient materials necessary or beneficial for sustaining biological activity in said biological reaction means is also preferably present and may be replenished in use, in the said aqueous reaction medium, to accelerate oxidative decomposition of the organic compound(s).

Examples of biologically active media include Pseudomonas sp., Klebsiella sp., Rhodococci sp., Flavobacterium sp., Bacillus sp., and 'white rot' fungii such as Sporotrichum sp., or Pleurotus sp.. The reader is directed to standard works on biological oxidative decomposition of organic compounds, such as 'Microbial Degradation of Xenobiotics and Recalcitrant Compounds' edited by T. Leisinger, A. M. Cook, R. Hutter and J. Nuesch FEMS Symposium No. 12, Academic Press, London, 1981, or 'Microbiological Decomposition of Chlorinated Aromatic Compounds' edited by M. L. Rochkind-Dubinsky, G. S. Sayler and J. W. Blackburn . . . Marcel Dekker, New York.

It is preferred that the aqueous feedstock is supplied and replenished continuously, to the interior hollow part of the selectively permeable tubular membrane. Thus the present method can be operated as a continuous treatment in which aqueous feedstock is fed continuously to the interior of the selectively permeable membrane whilst simultaneously on the exterior a stock of aqueous reaction medium is either supplied continuously or otherwise provided for batch processing. In this manner organic compound(s) present in the feedstock pass(es) across the selectively permeable tubing into the aqueous reaction medium. The "driving force" for the transfer of organic compounds across the membrane is, we assume, provided by the biologically active reaction means capable of reducing the concentration of the said organic compound(s) by oxidative decomposition within said aqueous reaction medium.

Treatment by batch-processing is also possible, within the scope of the present invention. For example, in an embodiment of batch-processing, a tubular membrane may be immersed in a batch of aqueous reaction medium, whilst aqueous feedstock is supplied to the interior of the tubing.

In embodiments of the invention, the aqueous reaction medium may be contained within one or more separate, controlled environment bioreactor(s) which is (are) continuously fed remotely from the polymeric membrane. Such an arrangement may offer much improved control of the environmental conditions sustaining the biological reaction means.

Figure 2:
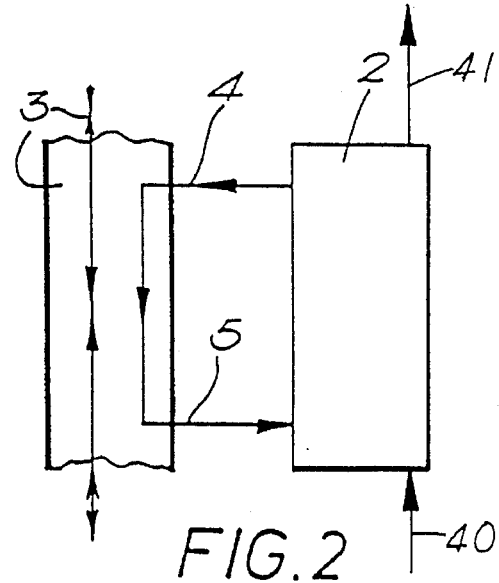
Figure 3:
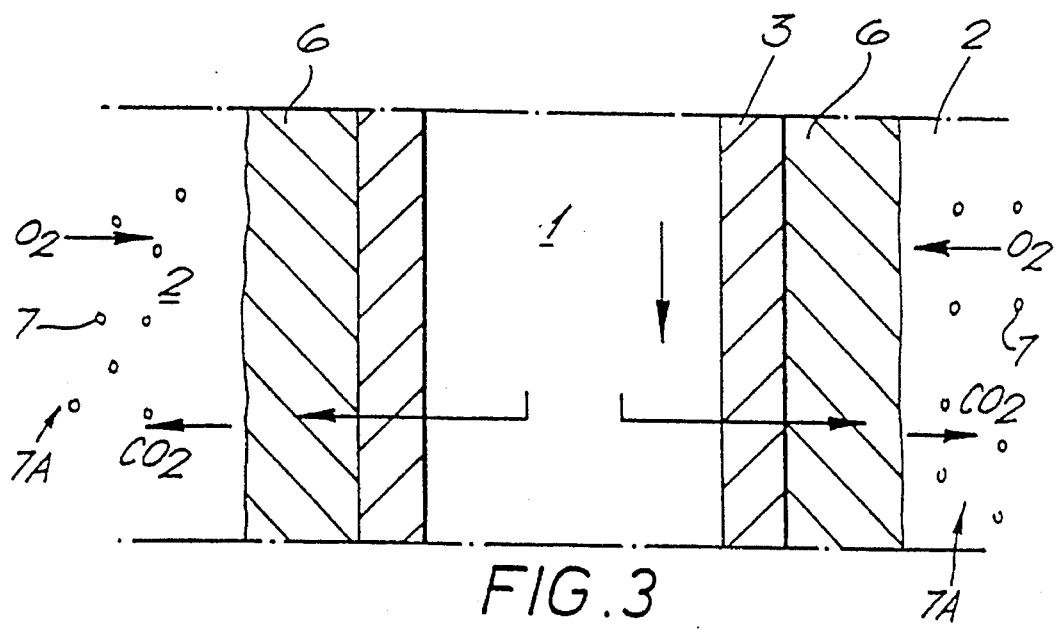
Figure 4:
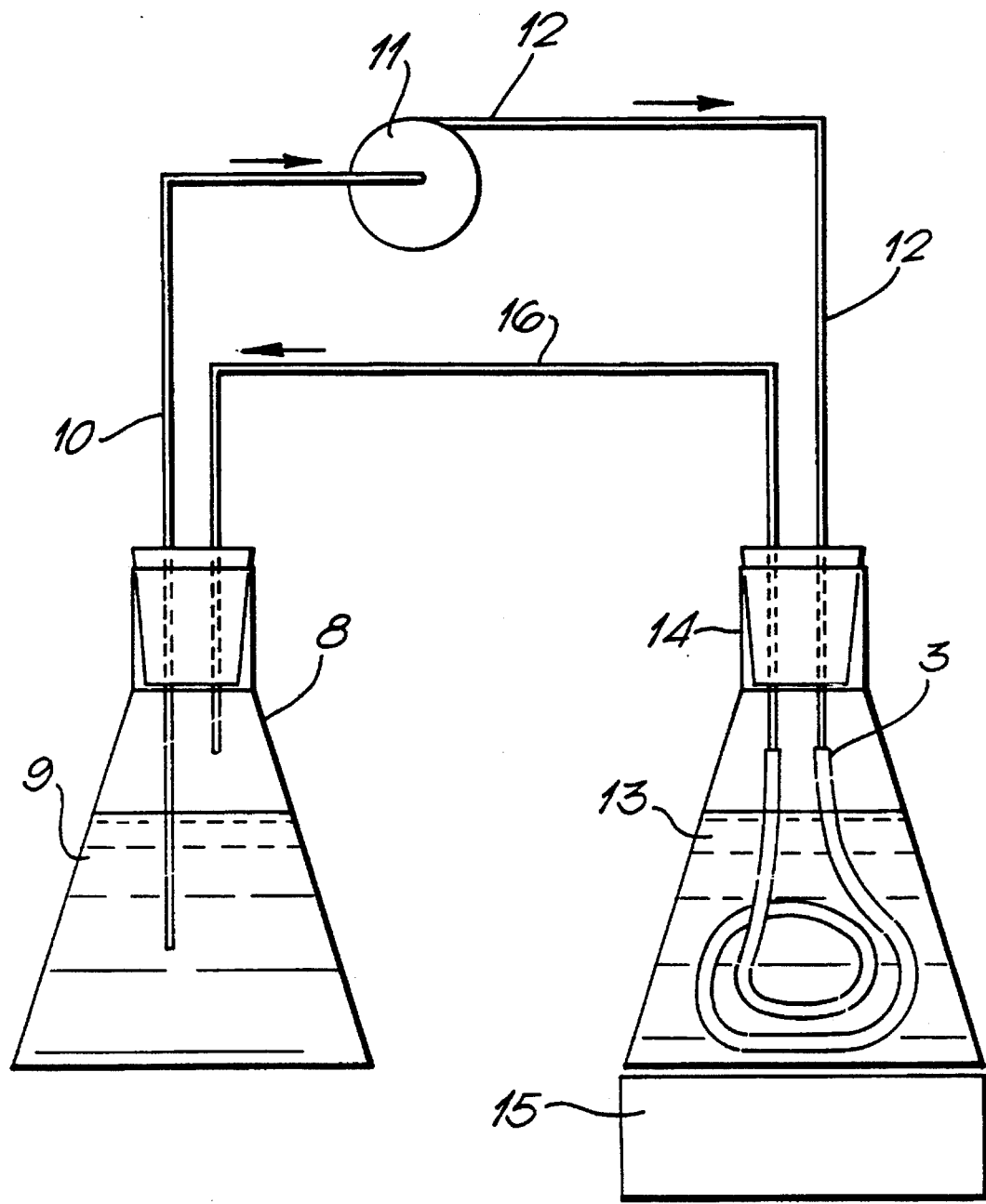
Figure 5:
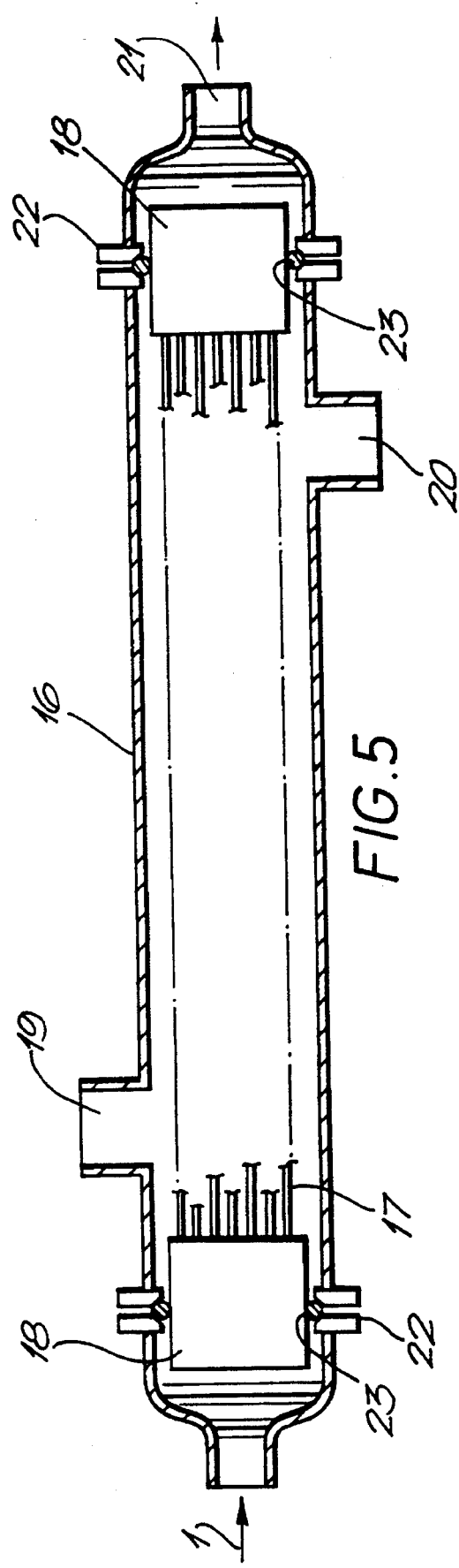
Figure 6:
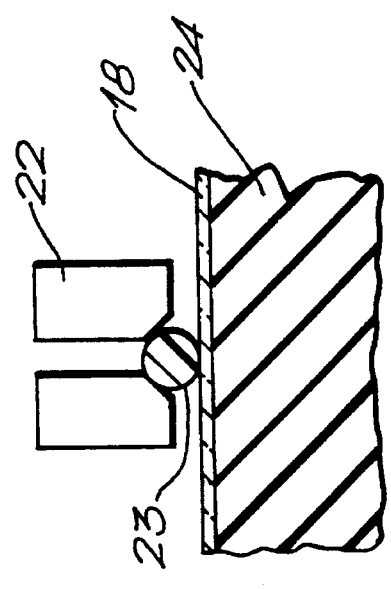
Figure 7:
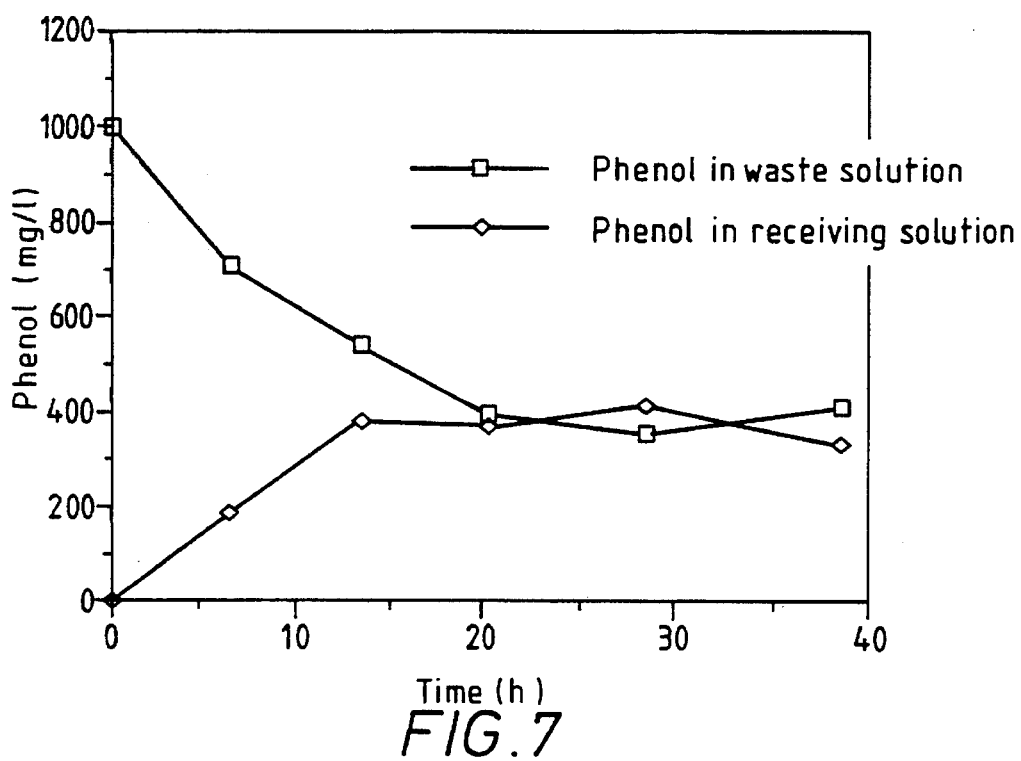
Figure 8:
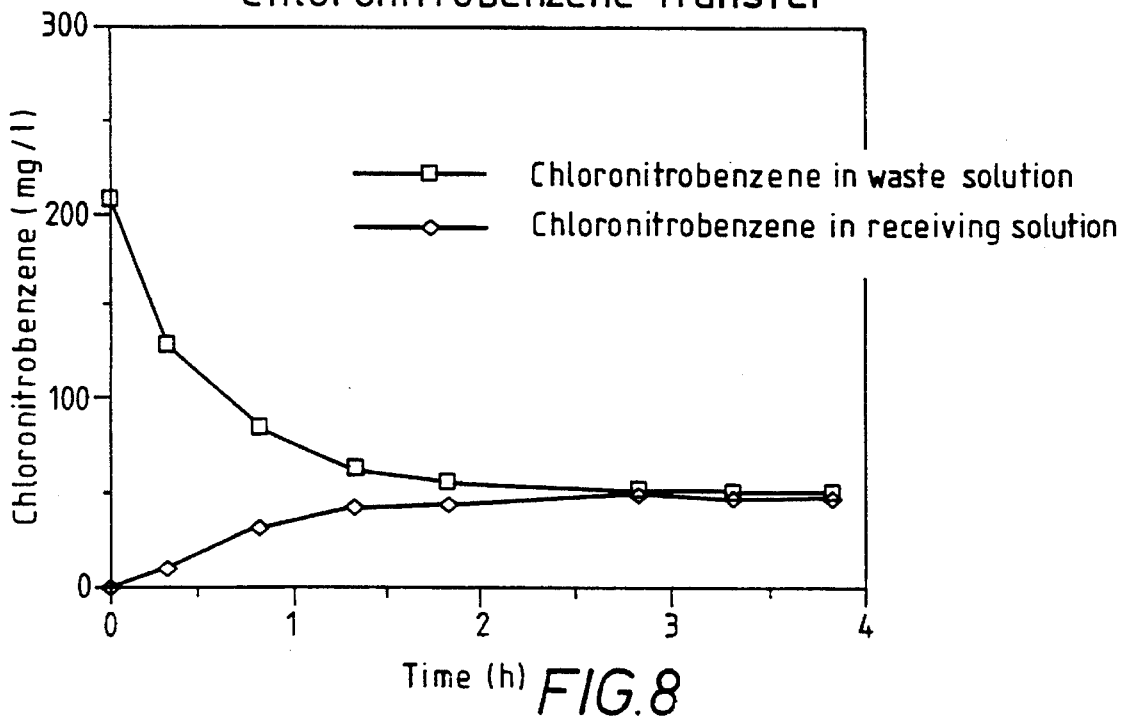
Figure 9:
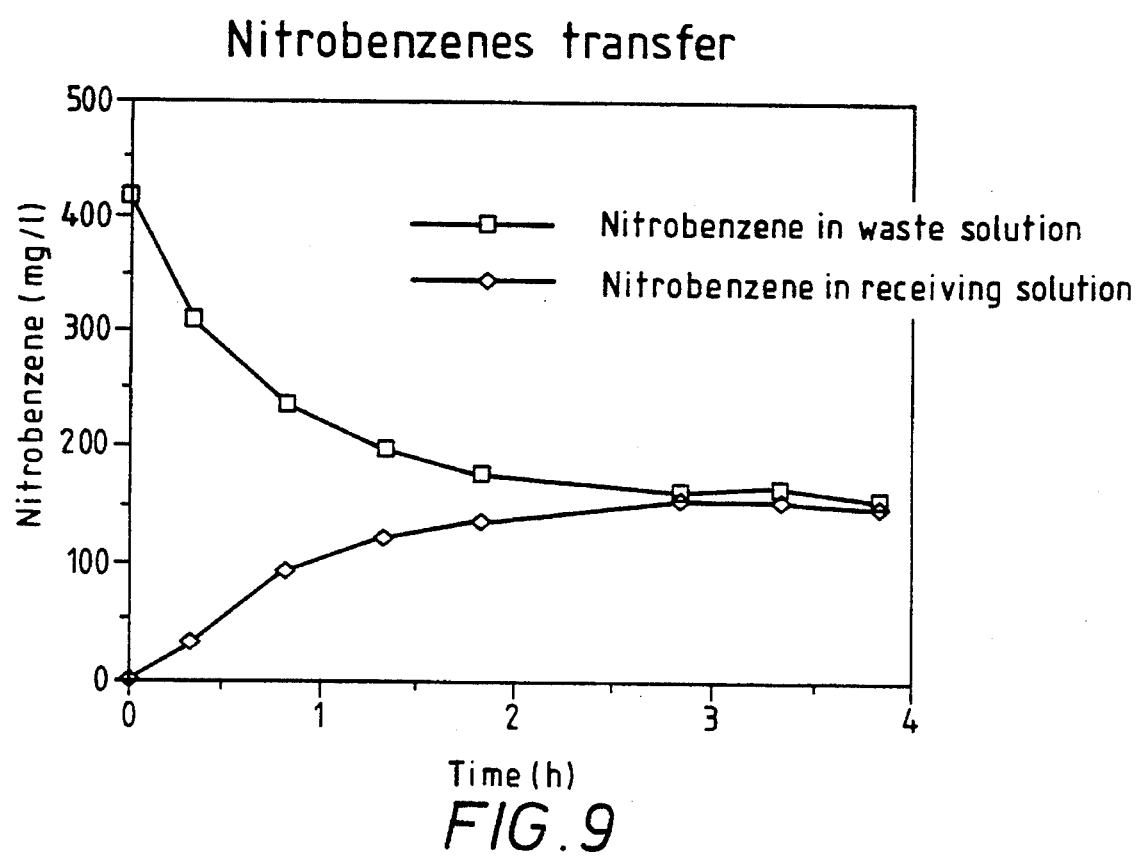
Figure 10:
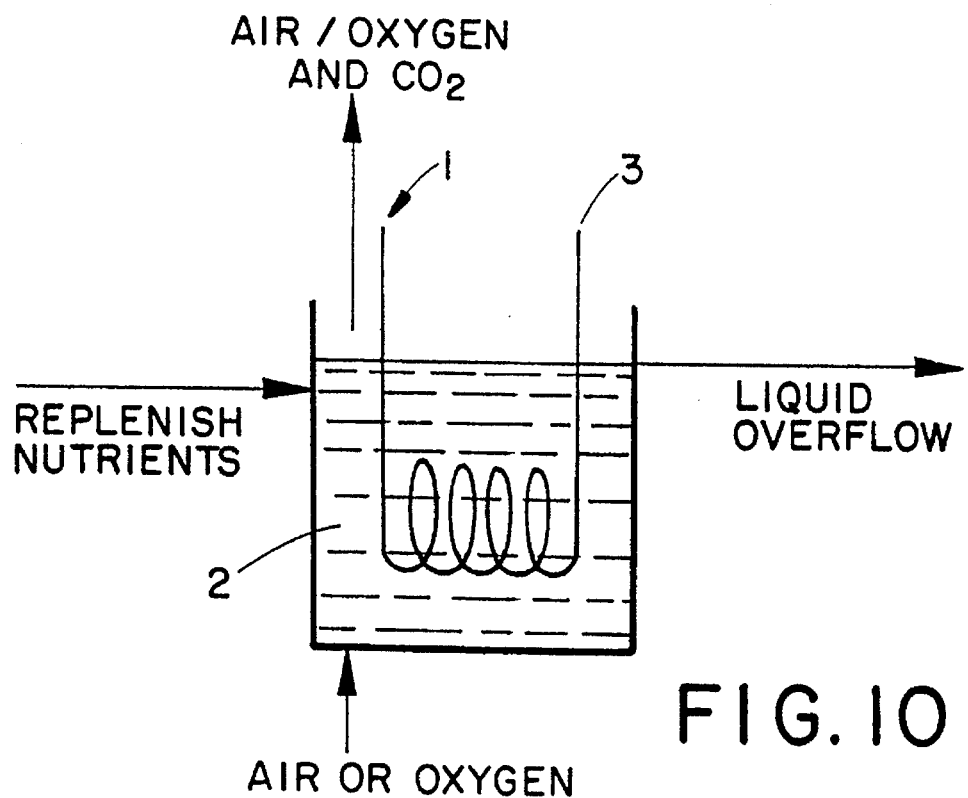
Figure 11:
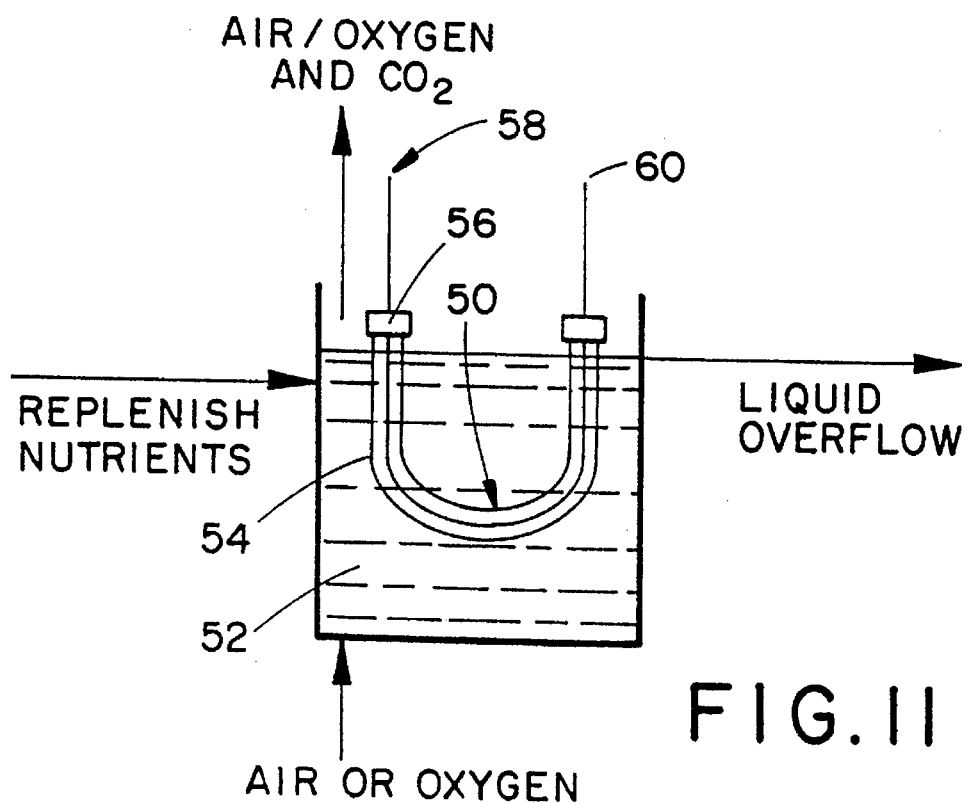

In order that the invention may be more easily understood and readily carried into effect, embodiments thereof are now described by way of non-limiting example only, in the accompanying drawings wherein:

FIG. 1 illustrates apparatus including tubular, coiled membrane,

FIG. 2 illustrates apparatus including a remote bioreactor supplied with liquid recycling means, FIG. 3 illustrates a method of reducing the concentration of volatile organic compounds, FIG. 4 illustrates an arrangement for determining the suitability of polymeric membrane for use in the invention, FIG. 5 shows a bioreactor module which can be coupled in series or in parallel with an aqueous feedstock, FIG. 6 is a detail of the sealing means used in the module shown in FIG. 6, FIG. 7 is a graph indicating phenol transfer as a function of time, FIG. 8 is a graph representing chloronitrobenzene transfer, as a function of time, FIG. 9 is a corresponding graph illustrating transfer of nitrobenzene from feedstock to reaction medium, FIG. 10 illustrates the apparatus of FIG. 1 while showing the gas flows and liquid flows into and out of the bioreactor, and FIG. 11 illustrates a bundle of tubes in a bioreactor.

In all the illustrated embodiments flexible, semi-transparent silicone rubber tubing was used of 2–3 mm overall diameter and this was found to be substantially impermeable to the chloride ion in aqueous media and substantially impermeable to nutrient salts in the reaction media.

The waste water employed as feedstock contained the organic pollutants phenol or nitrobenzene and/or chloronitrobenzene.

Referring to the drawings FIG. 1 illustrates a tubular membrane immersed in the bioreactor through which a stream of wastewater 1 is supplied through the interior of hollow tubing which acts as the membrane 3. The bioreactor side 2 of the apparatus comprises a receptacle containing water and biological reaction media, the tubular membrane being substantially immersed therein. The bioreactor side 2 comprises an aqueous system with microorganisms and nutrients therefor and in use organic material permeated through the membrane and was decomposed by biological oxidation in the bioreactor side. Accordingly the concentration of the organic compound(s) in the aqueous waste was correspondingly reduced. The hollow tubing can be removed for cleaning.

In all embodiments of the invention the environmental conditions of the bioreactor i.e. the aqueous medium containing the biological reaction means can be continuously monitored and controlled. Thus nutrients for sustained growth or efficiency of the microorganisms may be added, monitored and adjusted to optimise the rate at which organic compound(s) can permeate through the membrane for oxidative decomposition in an environment remote from the waste water. This is illustrated in FIG. 10 of the drawings. Also shown in FIG. 10 is that the micro-organisms in the bioreactor can be fed air or oxygen and produce $CO_2$.

The arrangement shown in FIG. 2 is a variation of the apparatus shown in FIG. 1 in that a membrane cartridge (an example of which is subsequently described with reference to FIG. 5) is used containing a suitable arrangement of membrane tubing, adapted to be fed with a supply of aqueous waste containing the organic pollutant(s) to be at least partially decomposed. The cartridge which is fed with the aqueous waste is linked by recycle lines 4, 5 to a remote bioreactor 2 which contains the aqueous reaction medium. Such an arrangement permits even finer control over the environmental conditions pertaining within the bioreactor side of the apparatus. As is conventional, a controlled atmosphere is maintained in the bioreactor 2. This is shown schematically by the arrows 40 and 41. A series of spaced membrane cartridges could be deployed such as several units as shown in FIG. 5 which are linked to one or more centralised bioreactors 2, and in liquid communication with the bioreactor(s).

The apparatus shown in FIG. 3 is particularly intended for the treatment of waste waters 1, containing VOC, a proportion of which hitherto has been permitted to escape into atmosphere in conventional treatments for their removal from aqueous wastes. The FIG. 3 arrangement shows in enlarged section a tubular membrane 3 through which a flow of waste water 1 is directed, the water containing such pollutants as e.g. methanol, ethanol, formaldehyde, acetone, chloroform, dichloroethane, trichloroethane or other low-molecular weight optionally substituted hydrocarbons. The membrane comprises e.g. silicone rubber tubing of wall thickness of the order 0.5 mm and overall diameter about 3 mm. At the exterior of the tubular membrane 3 the bioreactor side 2 of the apparatus is provided which comprises aqueous media containing biological oxidation means and through which an air (or oxygen) sparge (7a) is percolated, exemplified by bubbles 7 containing oxygen which feed the biofilm, and permit $CO_2$ which is formed to escape. A film of biological material, in the nature of a biofilm 6 builds up upon the exterior surface of the tubular membrane 3. It has been found that the tendency of the microorganisms is to agglomerate close to the source of their nutrient feedstock i.e. the organic compounds present in the waste water.

The biofilm is fed with oxygen (contained in the air bubbles) and respires carbon dioxide which can then safely be vented to atmosphere. It will be observed in the arrangement shown that the volatile organic compounds must encounter the biofilm (after it has built up) where they are oxidatively decomposed prior to venting or discharge from the apparatus.

It will be appreciated that there are possibly many types of membrane which may function in the present apparatus and method. Accordingly a simple test has been devised to establish the suitability or otherwise of any given material which falls within the membrane definition provided above. Such apparatus for preferential transfer testing is shown in FIG. 4 of the drawings wherein a first flask 8 contains the aqueous waste containing the organic compound(s) which is arranged to feed that aqueous waste, via line 10 (e.g. teflon tubing) and pump 11, such as a peristaltic pump, to supply line 12 which terminates within a second flask 14 whilst being joined to a length of 'potential membrane' tubing 3 constructed of a material whose suitability for use in the invention is to be determined. Its permeability to the chloride ion can first be measured by means known in the art.

The other end of the tubing 3 is connected to a return feed line 16 which leads from the second flask 14 to return the treated aqueous waste to the first flask 8.

The second flask 14 contains a receiving aqueous medium 13 which can be tested for presence of organic compound(s) initially present in the aqueous waste 9. It is essential that biological oxidation means are absent in this control otherwise the results of preferential testing will not be conclusive.

In order to determine whether a membrane of material will be effective in the present invention, the membrane, in the form of tubing 3 can be connected to this control apparatus, the pump 11 can be operated and the receiving medium 13 can be stirred by means of a magnetic stirrer 15. After a suitable passage of time, the receiving medium 13 can be analysed for presence of the organic compound(s) under investigation. If no transfer of organic compound occurs into the receiving medium, then the material selected will not be effective in the present invention.

The apparatus shown in FIG. 4 can also be used to optimise the material for use as the membrane. By maintaining other membrane transfer conditions constant, and varying the material 3 or its physical parameters, a range of potentially useful polymeric membranes may be deployed and the rates of permeation through the tubing measured and compared.

It has been found in initial tests that silicone rubber of thickness of the order 0.5 mm gives acceptable results, although other materials may work better.

FIG. 5 illustrates a modular membrane arrangement 16 of incorporating a multitude of individual tubular membranes, as a bundle 17 and extending between end pieces 18 formed from glass tubing, with the ends of the membranes cemented inside. The membrane module has an outer housing 16, with inlet 19 and outlet 20 for aqueous biologically active reaction media. Feedstock 1 is delivered at one end and exits as treated waste water from outlet 21. The bundle of membranes 17 is held in position by means of flanges 22 incorporating O-rings 23 located in liquid sealing engagement against the end pieces 18. The said end pieces are 'purpose-cast' silicone rubber sections 24 in which the bundle of tubular membranes can be embedded. Further detail thereof is apparent from FIG. 6. In such a modular arrangement, which can serve as the membrane cartridge described earlier (with reference to FIG. 2), the bundle of tubes can be removed for cleaning or replacement.

FIG. 11 illustrates a modular membrane arrangement 50 immersed in a bioreactor 52. The modular membrane arrangement 50 incorporates a multitude of individual tubular membranes 54 extending between end pieces 56. Feedstock 58 is delivered at one end and exits as treated waste water from an outlet 60.

Finally FIGS. 7–9 inclusive demonstrate the rate of transfer of selected organic molecules namely phenol, chloronitrobenzene and nitrobenzene from an industrial aqueous waste medium in which they are present by the use of silicone rubber tubing having a wall thickness of 0.5 mm.

In all cases an increase in concentration in the organic compound in the receiving solution was observed coupled with a corresponding decrease in the concentration of that compound in the aqueous feed solution. The permeability to chloride ion was negligible.

The principal advantage of using the present invention in biological decomposition of aqueous media containing one or more organic compounds resides in the capacity to control the bioreactor side of the apparatus. In particular it is possible to sustain the growth of biological means e.g. microorganisms in an aqueous system which is not subject to extremes of pH or substantial concentrations of one or more salts, since biological growth and capacity to oxidise is severely limited in, if not completely obviated in such hostile environments as may be found in the actual waste water.

Thus even waste waters which have extremes of pH and/or high salt concentrations can be used in the present invention.

The membrane and in particular silicone rubber such membranes have been found to act as an adsorbent to shock loadings of organic compound(s) due to changes in feedstock concentration and/or composition. Also, since nutrient salts are essentially prevented from permeating the membrane and thus cannot diffuse out of the reaction medium, it may only be necessary to add nutrients as required to sustain the degradation of the organic compound(s). This may be more economical than other treatments.

I claim:

1. Apparatus for reducing the concentration of at least one organic compound present in an aqueous feedstock, the apparatus comprising:

a water insoluble hollow tubular selectively permeable polymeric membrane whose permeability to said at least one organic compound exceeds its permeability to chloride ion, said tubular membrane having an inlet which receives a flow of aqueous feedstock and an outlet for discharging said feedstock after passage through said tubular membrane, a bioreactor receptacle containing therein aqueous reaction medium which comprises biologically active reaction means capable of reacting with said at least one organic compound and which reaction means can be fed with air or oxygen and nutrient salts, said tubular membrane being substantially immersed below the level of aqueous reaction medium contained in said bioreactor receptacle, said tubular membrane being substantially impermeable to the chloride ion and to nutrient salts when present in said aqueous reaction medium, and said membrane being removable from said aqueous reaction medium by withdrawing the immersed part of said tubing from said aqueous reaction medium, while maintaining the ability to flow aqueous feedstock therethrough.

2. Apparatus as claimed in claim 1 wherein the inlet of said tubular membrane and the outlet of said tubular membrane are spaced from the level of aqueous reaction medium contained in the bioreactor receptacle.

3. Apparatus as claimed in claim 2 wherein the inlet of said tubular membrane and the outlet of said tubular membrane are also spaced from the bioreactor receptacle.

4. Apparatus as claimed in claim 1 wherein said inlet and said outlet are both located above the level of aqueous reaction medium contained within the bioreactor receptacle.

5. Apparatus as claimed in claim 1 wherein said inlet and said outlet are remote from and independent of an inlet and an outlet of said bioreactor receptacle.

6. Apparatus as claimed in claim 1 wherein the tubular membrane is removable by withdrawing the immersed part from the bioreactor receptacle.

7. Apparatus as claimed in claim 1 wherein the tubular membrane is removable by simultaneously withdrawing the inlet end and the outlet end of said membrane from the bioreactor receptacle.

8. Apparatus as claimed in claim 1 wherein the tubular membrane comprises a flexible material.

9. Apparatus as claimed in claim 1 wherein the inlet and outlet of said tubular membrane are both located at one side of the bioreactor receptacle.

10. Apparatus as claimed in claim 1 wherein at least one of the inlet of said tubular membrane and the outlet of said tubular membrane extends out of the aqueous reaction medium contained in the bioreactor receptacle.

11. Apparatus as claim in claim 10 wherein said at least one of the inlet of said tubular membrane and the outlet of said tubular membrane which extends out of the aqueous reaction medium has an outer periphery in contact with an atmosphere in the bioreactor receptacle.

12. Apparatus as claimed in claim 1 wherein at least one of the inlet of said tubular membrane and the outlet of said tubular membrane is located outside the bioreactor receptacle.

13. Apparatus as claimed in claim 1 wherein the bioreactor receptacle is an open bioreactor receptacle in that the aqueous reaction medium has a surface exposed to the atmosphere forming a gas/liquid interface within said bioreactor receptacle.

14. A method of reducing the concentration of at least one organic compound present in an aqueous feedstock, comprising the steps of:

continuously supplying a flow of said aqueous feedstock to the interior of a substantially water-insoluble, selectively permeable, hollow tubular polymeric membrane whose permeability to said at least one organic compound exceeds its permeability to chloride ion, simultaneously maintaining in contact with the exterior surface of said tubular membrane an aqueous reaction medium provided within a bioreactor receptacle such that the membrane is substantially immersed within said aqueous reaction medium, the aqueous reaction medium containing biologically active reaction means capable of being fed with air or oxygen and of reacting with said at least one organic compound after it permeates through the tubular wall of the membrane, and wherein said tubular membrane is substantially impermeable to the chloride ion and to any nutrient salts if present in said aqueous reaction medium, periodically removing said tubular membrane from the aqueous reaction medium, and simultaneously maintaining the ability of the aqueous feedstock to flow through the tubular membrane.

15. A method as claimed in claim 14 wherein the ends of said tubular membrane are spaced from said aqueous reaction medium and from said bioreactor receptacle.

16. A method as claimed in claim 15 wherein the aqueous feedstock comprises waste water from an industrial process which contains a plurality of organic compounds.

17. A method as claimed in claim 16 wherein at least one of the organic compounds is volatile.

18. A method as claimed in claim 14 wherein a biologically active film of microorganisms forms at that surface of said membrane in contact with the aqueous reaction medium when the aqueous feedstock comprises at least one volatile organic compound.

19. A method as claims in claim 14 wherein the aqueous feedstock contains one or more of salts, acids or bases.

20. A method as claimed in claim 14 wherein the membrane is formed of synthetic or natural rubber.

21. A method as claimed in claim 20 wherein the rubber comprises silicone rubber.

22. A method as claimed in claim 21 wherein the silicone comprises an alkylsiloxane such as polydimethylsiloxane.

23. A method as claimed in claim 14 which utilizes an arrangement of one or more bioreactor receptacles having a controllable aqueous reaction medium environment.

24. A system of apparatus including a bioreactor receptacle suitable for carrying into effect a method of reducing the concentration of at least one organic compound present in an aqueous feedstock, comprising the steps of contacting a flow of the aqueous feedstock with one surface of a tubular membrane whose permeability to the at least one organic compound exceeds its permeability to chloride ion, and simultaneously maintaining in contact with the other surface of the tubular membrane an aqueous reaction medium capable of reacting with the at least one organic compound after it permeates through a wall of the membrane, wherein the system comprises:

an enclosed membrane module incorporating tubing of a substantially water-insoluble selectively permeable polymeric membrane, said tubing having a permeability to at least one organic compound which exceeds its permeability to chloride ion, and a separate, controlled environment bioreactor receptacle arranged remotely from the module in that said bioreactor receptacle is spaced from the module and open to the atmosphere or a controlled atmosphere but in liquid communication with the module via recycle lines which provide liquid communication of aqueous reaction medium from said separate bioreactor receptacle to said membrane module and from said membrane module back to said separate, controlled environment bioreactor receptacle such that an inlet flow of aqueous reaction medium containing biologically active reaction means can be provided from said separate bioreactor in liquid communication to said membrane module so as to contact the exterior surface of said tubing and an outlet flow containing the reaction medium can be returned to said separate bioreactor receptacle, the arrangement simultaneously permitting flow of said aqueous feedstock through an interior of the tubular membrane located within the module while a flow of said aqueous reaction medium contacts the exterior surface of the membrane tubing.

25. A system of apparatus as claimed in claim 24 wherein said membrane module comprises:

a housing having an inlet for receiving said aqueous biologically active reaction medium and an outlet therefor, a plurality of tubular membranes held in said housing and extending between an inlet for receiving said aqueous feedstock and an outlet for said feedstock, means provided in said apparatus for preventing mixing between said feedstock and said reaction medium, and wherein each of said tubular membranes is comprised of a substantially water-insoluble selectively permeable polymeric membrane, having a permeability to said at least one organic compound greater than its permeability to chloride ion.

26. A system of apparatus as claimed in claim 24 wherein said plurality of tubular membranes is removable from said bioreactor and replaceable after removal.

27. A system of apparatus as claimed in claim 26 wherein the ability to flow aqueous feedstock is maintained when said plurality of tubular membranes is removed from said bioreactor.

28. A system of apparatus as claimed in claim 24 wherein said tubing comprises a silicone rubber polymeric membrane.

29. A system of apparatus as claimed in claim 28 wherein a silicone of said silicone rubber polymeric membrane comprises an alkylsiloxane silicone.

30. A system of apparatus as claimed in claim 29 wherein the alkylsiloxane silicone comprises polydimethylsiloxane.

31. A system of apparatus as claimed in claim 24 wherein said tubing has a wall thickness of 0.001 to 10 mm.

32. A system of apparatus as claimed in claim 24 wherein said tubing has an external diameter in excess of 0.5 mm.

33. A system of apparatus as claimed in claim 32 wherein said tubing has an external diameter of 2 to 3 mm.

34. A system of apparatus as claimed in claim 24 wherein said tubing comprises a flexible material.

35. A system of apparatus as claimed in claim 24 wherein said membrane module comprises at least two spaced tubes which are connected to each other, at least at one end, by an end piece.

36. A system of apparatus as claimed in claim 24 wherein said membrane module comprises a plurality of spaced tubes which are disposed substantially parallel to each other and are connected at each end by a respective end piece.

* * * * *